United States Patent [19]

LaBerge

[11] Patent Number: 5,132,692
[45] Date of Patent: Jul. 21, 1992

[54] METHOD AND MEANS FOR SWITCHOVER FROM PRIMARY EQUIPMENT TO STANDBY EQUIPMENT IN A MICROWAVE LANDING SYSTEM

[75] Inventor: Edward F. C. LaBerge, Baltimore, Md.

[73] Assignee: Allied-Signal Inc., Morris Township, Morris County, N.J.

[21] Appl. No.: 755,972

[22] Filed: Sep. 6, 1991

[51] Int. Cl.⁵ ............................................. G01S 7/40
[52] U.S. Cl. .................................. 342/173; 342/408; 455/115
[58] Field of Search ................ 342/408, 412, 173; 455/115

[56] References Cited

U.S. PATENT DOCUMENTS

| 4,757,316 | 7/1988 | Brault et al. | 342/408 |
| 4,764,772 | 8/1988 | Becker | 342/408 |
| 4,940,984 | 7/1990 | Kleiber | 455/115 |

Primary Examiner—Theodore M. Blum
Attorney, Agent, or Firm—Howard G. Massung; Robert A. Walsh

[57] ABSTRACT

In a Microwave Landing System (MLS) transmitting landing guidance signals and data signals according to a time division multiplex signal format, a method and means for replacing faulty primary equipment with standby equipment. Redundant electronics units are provided for generating guidance and data signals. Transfer control means connect alternate ones of the electronics units to the appropriate antenna of the system such that no two consecutive transmissions of the same guidance or data signal is made by the same electronics unit. The signals transmitted by the system are monitored for accuracy and conformity to the signal format. If a fault is detected in a monitored signal, the electronics unit responsible for generating the faulty signal is no longer used and system operation continues with non-faulty units, unless the faulty detected indicates antenna misalignment. If antenna misalignment occurs, system operations are halted.

9 Claims, 6 Drawing Sheets

FIG. 3A

| TIME (msec) | SEQUENCE NO.1 | SEQUENCE NO.2 |
|---|---|---|
| 0 | APPROACH ELEVATION | APPROACH ELEVATION |
| 10 | | |
| 20 | APPROACH AZIMUTH | |
| 30 | | |
| 40 | APPROACH ELEVATION | GROWTH, e.g. 360° AZIMUTH, 18.2msec MIN., NOTE 2 |
| 50 | (NOTE 1) BACK AZIMUTH | |
| 60 | (NOTE 2) APPROACH ELEVATION | |
| | 66.7 66.8 | |

35 — APPROACH ELEVATION
36 — APPROACH AZIMUTH
37 — APPROACH ELEVATION
38 — (NOTE 1)
39 — BACK AZIMUTH
40 — (NOTE 2)
41 — APPROACH ELEVATION
42 —

NOTES:
1. WHEN BACK AZIMUTH IS PROVIDED, BASIC DATA WORD NO.2 MUST BE TRANSMITTED ONLY IN THIS POSITION.
2. BASIC DATA WORDS MAY BE TRANSMITTED IN ANY OPEN TIME PERIODS.

FIG. 3B

| TIME (msec) | SEQUENCE NO.1 | SEQUENCE NO.2 |
|---|---|---|
| 0 | APPROACH ELEVATION | APPROACH ELEVATION |
| 10 | HIGH RATE APPROACH AZIMUTH | HIGH RATE APPROACH AZIMUTH |
| 20 | 4 BASIC DATA WORDS (NOTE 1) | (NOTE 2) |
| 30 | | BACK AZIMUTH |
| 40 | HIGH RATE APPROACH AZIMUTH | HIGH RATE APPROACH AZIMUTH |
| 50 | APPROACH ELEVATION | APPROACH ELEVATION |
| 60 | HIGH RATE APPROACH AZIMUTH | HIGH RATE APPROACH AZIMUTH |
| | APPROACH ELEVATION 64.9 | APPROACH ELEVATION 67.5 |

NOTES:
1. BASIC DATA WORDS MAY BE TRANSMITTED IN ANY OPEN TIME PERIODS.
2. WHEN BACK AZIMUTH IS PROVIDED, BASIC DATA WORD NO.2 MUST BE TRANSMITTED ONLY IN THIS POSITION.

FRAME REQUEST A/B

FRAME REQUEST A/B

METHOD AND MEANS FOR SWITCHOVER FROM PRIMARY EQUIPMENT TO STANDBY EQUIPMENT IN A MICROWAVE LANDING SYSTEM

The present invention relates generally to microwave landing systems (MLS). More particularly, it relates to a method for switching from primary MLS equipment to "hot" standby MLS equipment if a failure should occur in the primary MLS equipment.

BACKGROUND OF THE INVENTION

The aircraft landing guidance system in current use throughout the world is the Instrument Landing System (ILS). The ILS is a fixed beam system that provides lateral guidance through a localizer antenna and transmitter operating at about 100 Mhz, and vertical guidance through a glide slope antenna and transmitter operating at about 300 Mhz. Both the localizer and glide slope transmissions are continuous wave transmissions. Limitations of the ILS with respect to precision of guidance, channel capacity, and complexities of installation involving extensive site preparation have led to the development of the MLS.

The MLS, as standardized by the International Civil Air Organization (ICAO), transmits lateral (azimuth) and vertical (elevation) guidance signals using a time referenced scanning beam technique and a time division multiplex signal format. The employment of a time division multiplex (TDM) signal format permits the transmission of both the azimuth and the elevation guidance signals on the same r.f. channel without creating confusion or interference between the two. The TDM signal format, more fully described hereinafter, comprises a repetitive sequence of azimuth, elevation, and back course azimuth guidance signals. A unique identification code is assigned to each of the guidance function signals. Data words are interspersed with the guidance function signals. Each of the data words is identified by a unique code and each word contains information, as specified by ICAO standards, relating to the MLS equipment installed at the airport, geometry of the MLS installation, runway conditions, etc.

The requirements for system integrity and continuity of service for both the ILS and MLS are stringent. A failure in either system could lead to disaster, especially if the failure should occur when an aircraft is in the critical phase of an approach to landing. In the context of this application, the term "system integrity" refers to the probability that the system will radiate only valid guidance data.

In ILS, the best method currently available for assuring guidance continuity and integrity is to provide standby equipment for the primary equipment and to conduct periodic tests of the primary equipment to detect faults in the radiated signals. Certain of the tests are of such nature that they cannot be conducted safely while an aircraft is using the system. In any event, changeover from primary to standby equipment cannot be made in an ILS without creating discontinuities in the radiated signals.

In MLS, the TDM signal format admits of the possibility of changeover from primary equipment to standby equipment without creating discontinuity in the radiated signals.

It is an object of the invention to provide in an MLS a method and means for switching operations from primary equipment to standby equipment without creating transients in the radiated signals.

It is another object of the invention to provide in an MLS a method and means for continuously verifying the integrity of both primary equipment and standby equipment without affecting the guidance provided by the system to approaching aircraft.

It is a further object of the invention to provide in an MLS a method and means for assuring continuity of service such that aircraft are never presented with a period of totally erroneous guidance signals and such that the probability of an aircraft receiving erroneous data during any period is not greater than fifty percent.

Other objects and advantages of the invention will become evident as a complete understanding thereof is gained from the following complete description and the accompanying drawings.

SUMMARY OF THE INVENTION

Briefly, the invention comprises an MLS having scanning beam antennas for transmitting elevation and azimuth guidance signals and such auxiliary antennas as may be required by the particular MLS installation. The azimuth and elevation equipments both include at least two completely redundant electronic units, each of which is capable of independently generating all of the guidance and data signals radiated by the system. Integral and field monitor antennas are provided for sampling the signals radiated by the system antennas. A transfer switch and control alternately interchanges the redundant electronic units energizing the antennas so that consecutive transmissions of the same data or guidance functions are always supplied by a different one of the electronic units. The signals sampled by the monitor antennas are fed back to monitor units associated with each of the redundant electronic units so that the integrity of the signals in space generated by each of the electronics units is tested while those units are connected as the active unit to the antennas. If a fault is signaled, decision logic associated with the transfer control, either: discontinues all operations by the system; selects the non-faulty electronic unit for all further operations; or, ignores the fault signal and continues to alternate operations between the electronic units. In any case, transmissions from a faulty unit are disabled.

DESCRIPTION OF THE DRAWINGS

FIGS. 3A, 3B, and 3C are diagrams of a Time Division Multiplex signal format standardized by the International Civil Air Organization;

DETAILED DESCRIPTION OF THE INVENTION

Figure 1:
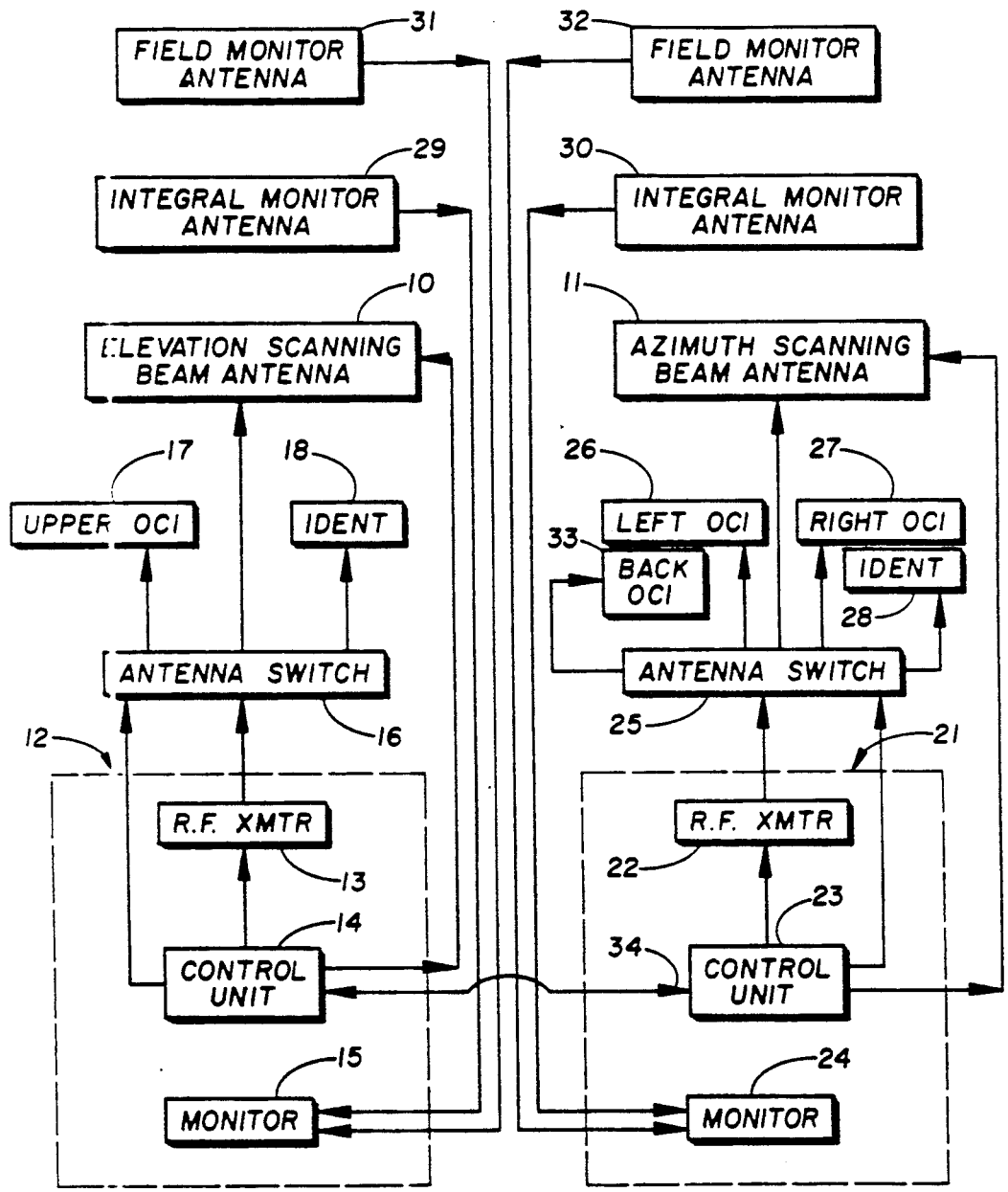
FIG. 1 is a simplified block diagram of a basic Microwave Landing System.

FIG. 1 is a simplified block diagram of a basic Microwave Landing System. The MLS provides landing guidance to an aircraft by transmitting from an elevation scanning beam antenna 10 a beam scanned in the elevation plane and by transmitting from an azimuth scanning beam antenna 11 a beam scanned in the azimuth plane. The beams of antennas 10 and 11 are scanned at a standard rate TO and FRO in their respective planes to generate proportional azimuth and elevation guidance signals. An aircraft determines the azimuth and elevation angles from an airport runway to its location by measuring the time difference between reception of the TO scan and reception of the FRO scan of each of the azimuth and elevation beams. Out of clearance indicator (OCI) signals of a fixed nature are also transmitted to insure that aircraft guidance is not derived outside the zones in which valid proportional azimuth and elevation guidance signals are transmitted. For example, the azimuth scanning beam coverage might be 40° about the runway center line. An aircraft located outside this proportional guidance coverage area might receive reflections of the valid guidance signals and could derive erroneous guidance information from such reflections. However, the aircraft would then be located within the coverage area of an OCI antenna and would receive an OCI signal of greater amplitude than the amplitude any reflections of the valid guidance signals. The OCI signal will thus enable the aircraft receiver to recognize the reflected signals as being spurious.

Elevation scanning beam antenna 10 is excited and controlled by an electronics unit 12 which includes an r.f. transmitter 13, a control unit 14 and a monitor 15. The output of transmitter 13 is applied through an antenna switch 16 to a selected one of the elevation scanning beam antenna 10, an upper out-of-clearance indicator (OCI) antenna 17 or an identification antenna 18. Control unit 14 determines the guidance function or data word to be transmitted according to a standard time division multiplex (TDM) signal format, later described; controls antenna switch 16 to select the appropriate antenna 10, 17, or 18; modulates the r.f. carrier of transmitter 13 to convey the preamble or data word information required by the signal format; and supplies steering command signals to the elevation scanning beam antenna 10.

Azimuth scanning beam antenna 11 is controlled and excited by an electronics unit 21 which includes an r.f. transmitter 22, a control unit 23 and a monitor 24. The output of transmitter 22 is applied through an antenna switch 25 to either the azimuth scanning beam antenna 11, a left OCI antenna 26, a right OCI antenna 27, a back OCI antenna 33, or an identification antenna 28, as determined by control unit 23. Like control unit 14, control unit 23 determines the guidance function or data word to be transmitted according to the TDM signal format; controls antenna switch 25 to select the appropriate antenna 11, 26, 27, 28, or 33; modulates the r.f. carrier of transmitter 22 to convey the preamble or data word information required by the signal format; and supplies steering command signals to the azimuth scanning beam antenna 11. Control units 14 and 23 exchange synchronizing and data signals over bus 34 to maintain the proper order of transmission of guidance functions and data words according to the signal format.

Integral monitor antennas 29 and 30 are respectively associated with the elevation scanning beam antenna 10 and the azimuth scanning beam antenna 11. Monitor antennas 29 and 30 are constructed as an integral part of the scanning beam antenna with which they are associated to provide an r.f. signal pickup for input to monitors 15 and 24. Monitors 15 and 24 each test the signal input from an integral monitor antenna to determine the quality of the signal radiated by a scanning beam antenna. Monitors 15 and 24 may test such factors as the power level of the radiated signals, signal timing and synchronization, and accuracy of modulation. Field monitor antennas 31 and 32, respectively associated with elevation scanning beam antenna 10 and azimuth scanning beam antenna 11, are located at known bearings and distances from the scanning beam antennas with which they are associated. The field monitor antennas provide signal inputs to monitors 15 and 24 from which the accuracy of alignment of the scanning beams with the airport runway and the accuracy of the course data being transmitted may be determined.

Certain airports may be equipped with MLS providing more complete coverage than the MLS shown in FIG. 1. In a full coverage system an additional scanning beam antenna would be included to provide back azimuth guidance signals. The Time Division Multiplex (TDM) signal format for MLS is designed to accommodate full coverage systems as well as simpler systems providing less than full coverage. Standards for the TDM signal format are published in "Microwave Landing System (MLS) Characteristics", Section 3.11, Chapter 3; International Standards and Recommended Practices, Aeronautical Telecommunications Annex, Vol. 10, available from the International Civil Air Organization, Montreal, Que., Canada.

Figure 2:
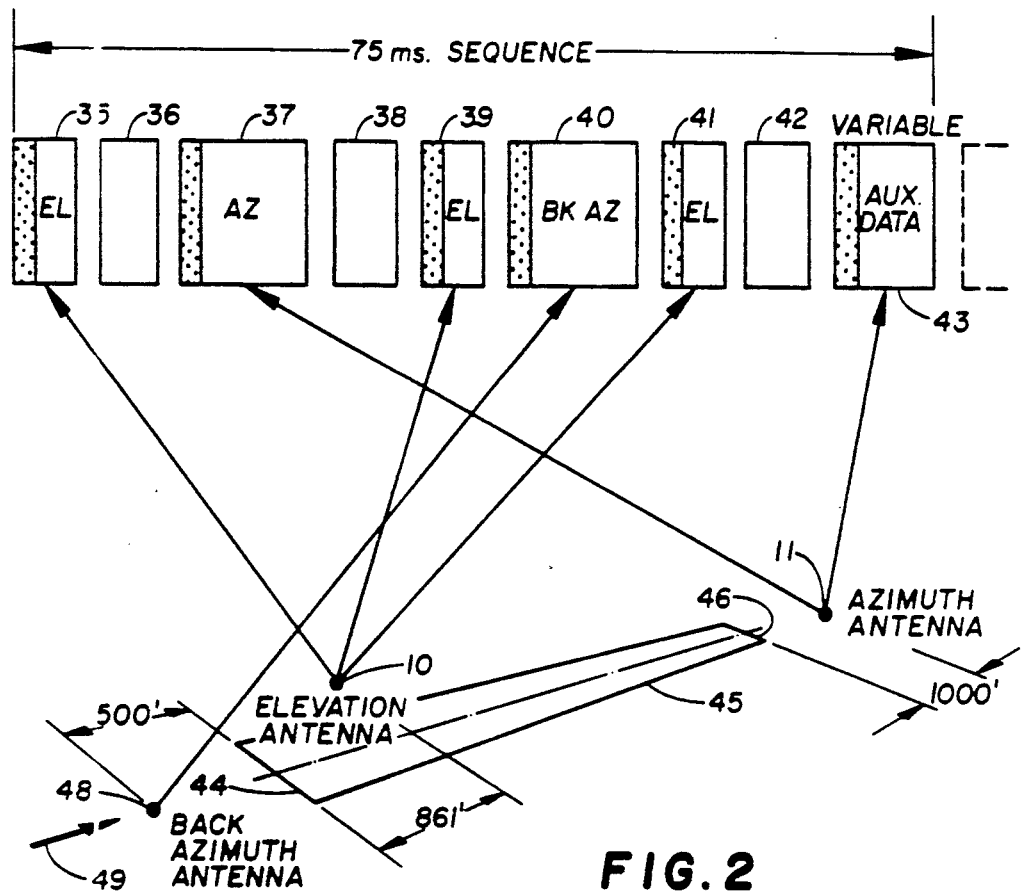
FIG. 2 is a diagram showing a generalized Time Division Multiplex signal format used in a full coverage Microwave Landing System and the location with respect to an airport runway of the antennas transmitting the MLS signals.

FIG. 2 illustrates a generalized sequence of the TDM signal format used in a full coverage MLS. The sequence comprises an ordered series of time frames 35–43 during which the various guidance signals and data words needed to guide an aircraft to landing are transmitted. The first time frame 35 of the sequence is assigned to transmission of the elevation guidance function. During frame 35, elevation antenna 10, located near the approach end 44 of the runway 45, transmits a scanning beam away from the stop end 46 of the runway.

Time frame 37 is assigned to the azimuth guidance function. During frame 37, azimuth antenna 11, located forward of the approach end 46 of the runway, transmits a beam scanned in azimuth towards aircraft approaching the runway in the direction shown by arrow 49. Data words are also transmitted by azimuth antenna 11, either following certain time frames within a sequence or between sequences. In the sequence of FIG. 2, time frames 36, 38, and 42 are not assigned to guidance functions and may be used for transmitting data words or be left open.

Time frames 39 and 41 are assigned to repetition of transmission of the elevation guidance function, as in frame 35. Time frame 40 is assigned to transmission of the back azimuth guidance signal by a back azimuth antenna 48 located beyond the end 44 of the runway. Back azimuth antenna 48 transmits a scanning beam directed away from runway approach end 44 toward runway stop end 46 to provide azimuth guidance for an aircraft executing a missed approach. Time frame 43 is of variable length and content to accommodate from zero to three data words. Each of the time frames of a sequence is preceded by a preamble, indicated by the shaded areas 49, identifying the function of the time frame with which it is associated. Thus, it is not necessary for an aircraft to receive the time frame transmissions in any particular order to identify the data being received.

Figure 3C:
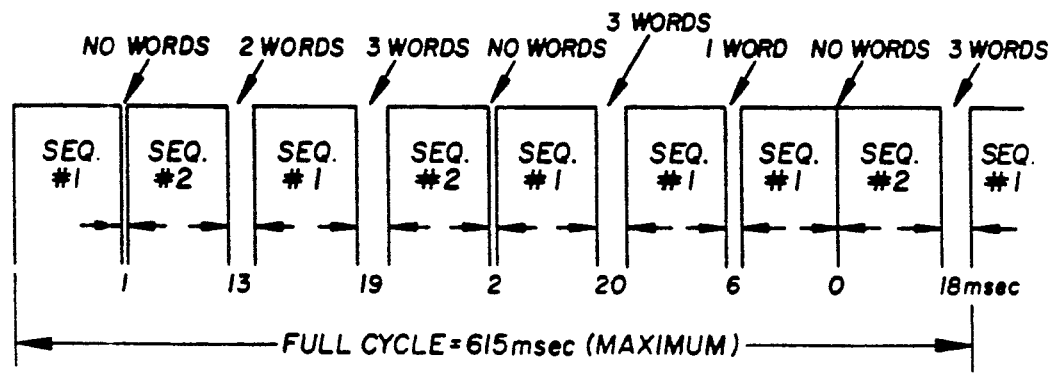

The sequence of FIG. 2 is a generalized representation of the TDM signal format. More exact presentations of the TDM signal formats used in two different MLS installations are seen in FIGS. 3A and 3B. FIG. 3A shows the signal format recommended for a full coverage MLS installation and FIG. 3B shows the signal format recommended for an MLS installation providing high rate azimuth guidance. Different MLS installations are designed to accommodate the different service needs and different terrains of airports. For example, a high rate azimuth MLS might be installed at an airport where the approach lanes to the runway are narrowed by obstacles. Variations in the signal formats of FIGS. 3A and 3B are permissible, as may be dictated by a particular MLS installation. In a basic MLS as shown in FIG. 1, back azimuth guidance is not provided. The time frames of the signal format assigned to such guidance functions may therefore be assigned to transmission of data words. FIG. 3C shows the complete cycle of the TDM signal format. It will be seen from FIG. 3C that the time frames of the signal format are not allocated equally between all guidance functions provided by an MLS. Moreover, the data words included in one signal cycle may not be repeated in a following signal cycle. Therefore, mere alternation of transmissions by redundant azimuth and redundant elevation transmitters during their respectively assigned time frames will not insure that at least fifty percent of the data transmissions of an MLS are without fault.

To simplify explanation of the invention, the invention will be described in detail as applied to the azimuth station of a basic MLS as shown in FIG. 1. It is to be understood that the elevation station of an MLS constructed in accordance with the invention is constructed correspondingly to the azimuth station, next to be described.

Figure 4:
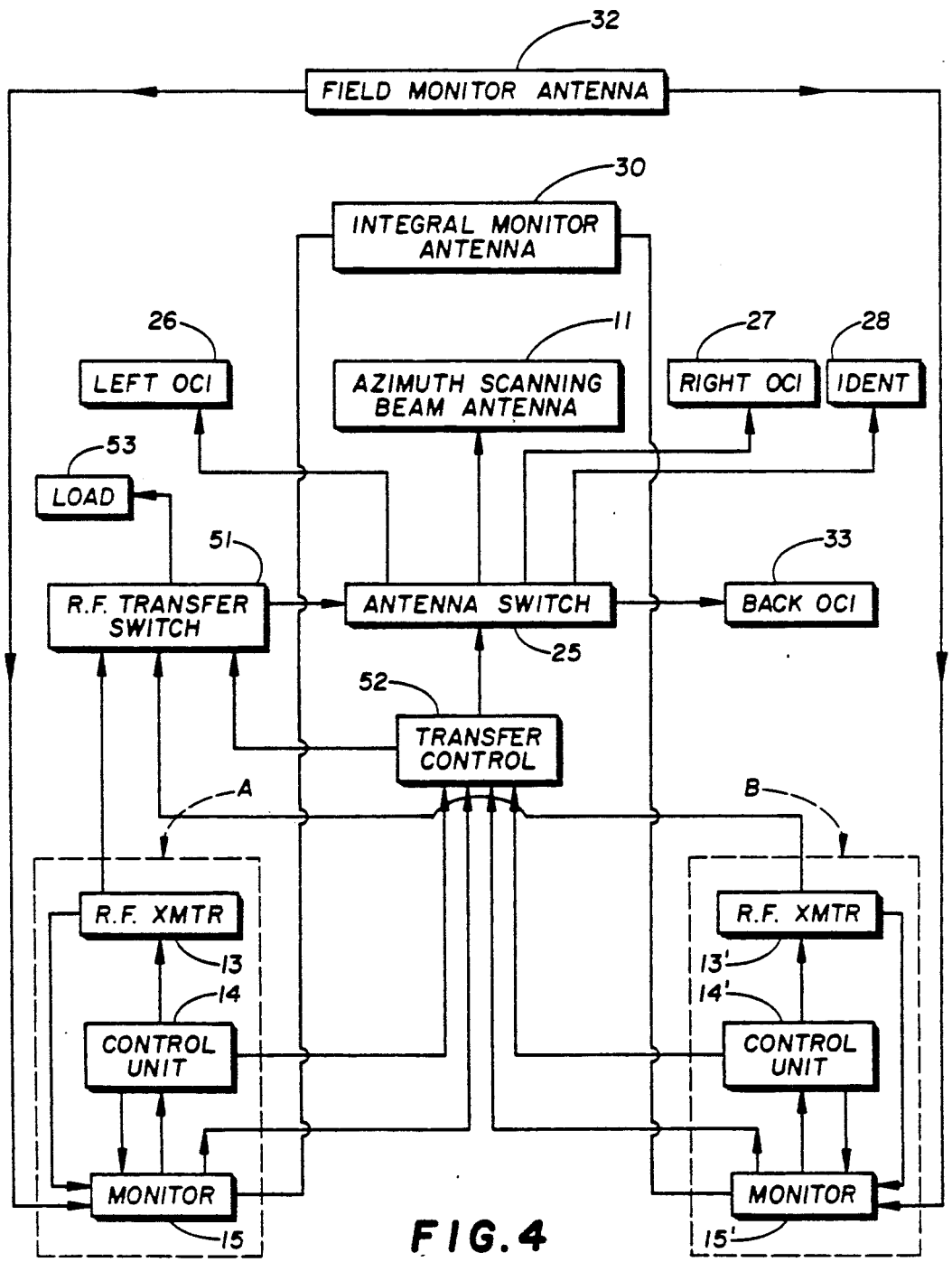
FIG. 4 is a simplified block diagram of an azimuth station of an MLS constructed in accordance with the invention.

FIG. 4 is a block diagram of a redundant azimuth station for an MLS constructed according to the present invention. The MLS is a basic configuration, similar to that of FIG. 1. The azimuth station includes an azimuth scanning beam antenna 11, a left OCI antenna 26, a right OCI antenna 27, a back OCI antenna 33, an identification antenna 28, an antenna switch 25, an integral monitor antenna 30, and a field monitor antenna 32. Duplicate electronic units A and B, corresponding to electronics unit 12 of FIG. 1, are provided. Each of electronics units A and B includes an r.f. transmitter 13, 13'; a control unit 14, 14'; and a monitor 15, 15'. Synchronizing and data signals are exchanged over buses 33 and 33' between control units 14, 14' and the control units of the redundant electronics units of the elevation station (not shown) of the MLS. Both electronics units A and B operate simultaneously during the time frames assigned to the azimuth station in the TDM signal format, with each of the units A and B performing the same functions during the same time frames. The outputs of r.f. transmitters 13 and 13' are applied to an r.f. transfer switch 51 which operates under the direction of a transfer control 52 to connect the r.f. outputs of electronic units A and B interchangeably to a load 53 and to antenna switch 25. That is, when transfer control 52 directs transfer switch 51 to connect the outputs of electronics unit A to antenna switch 25, the outputs of electronics unit B are connected to load 53, and vice versa. Integral monitor antenna 30 and field monitor antenna 32 return to the monitors 15 and 15' samples of the signal generated by the selected electronics unit A or B and samples of the signal in space radiated by the selected antenna. When transfer control 52 selects electronics unit A as the active element, monitor antenna 30 returns samples of the signal generated by unit A to monitor 15 for measure of the conformity of the signal with the signal format while monitor antenna 32 returns samples of the signal in space to monitor 15 for determination of the accuracy of alignment of the selected antenna with the airport runway. Similarly, when transfer control 52 selects electronics unit B as the active element, samples of the signal generated by unit B and samples of the signal in space are returned by antennas 30 and 32 to monitor 15' for measure of the system performance when configured with electronics unit B as the active element.

If either of the monitors 15 or 15' detects a fault in the signal conformity when their associated electronics unit is active, a fault signal is transmitted to the control unit 14 or 14' of the associated unit, causing that unit to be disabled from further transmissions. The fault signal is also transmitted to transfer control 52 causing control 52 to no longer select the faulty electronics unit for transmissions. If the fault detected by either of monitors 15 or 15' indicates misalignment of the antenna with the airport runway, the fault signal transmitted by the monitor not only causes the then active electronics unit to be disabled but it causes transfer control 52 to shut down completely system operations.

Thus, the performance of the entire system is monitored end-to-end, with the redundant electronic units A and B each being monitored when operated in combination with the nonredundant elements of the system, such as antenna switch 25 and antennas 11, 26, 27, and 28.

Figure 5:
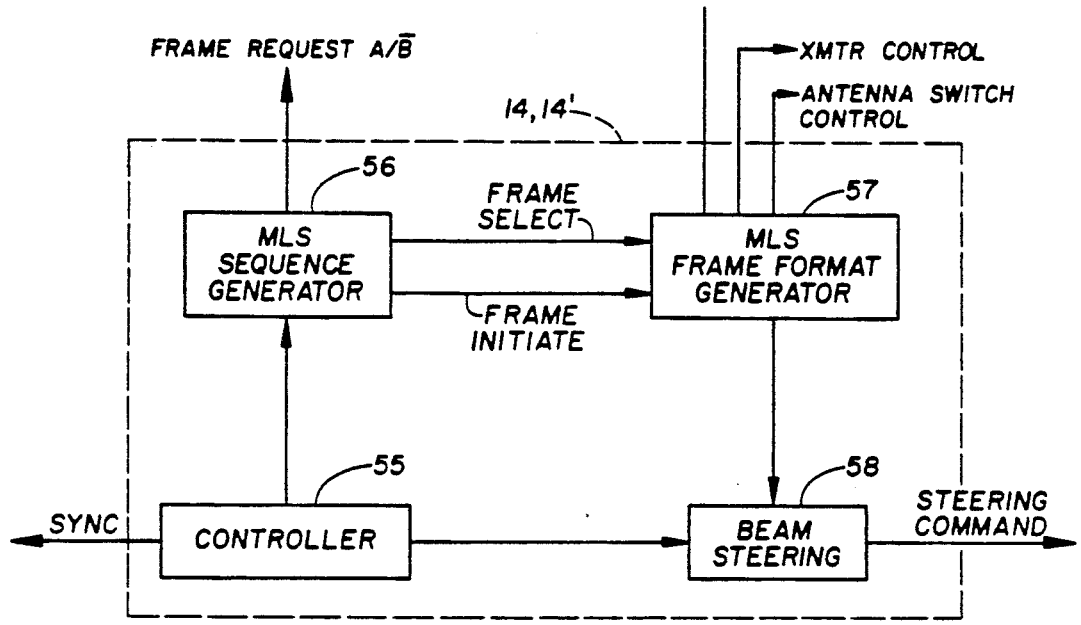
FIG. 5 is a block diagram of a control unit forming a part of each of the electronics units shown in FIG. 4.

Referring to FIG. 5, control unit 14, 14' includes a controller 55, an MLS sequence generator 56, an MLS frame format generator 57, and a beam steering command generator 58. Sequence generator 56 determines the function to be performed by the azimuth station according to the TDM signal format, e.g., azimuth guidance, data word, etc., and commands format generator 57 to select the stored frame format that is appropriate for the current function. Sequence generator 56 also furnishes a frame request signal to transfer control 52 that determines, in part, whether electronics unit A or B is to be the active unit to perform the current function. The selection of the frame request signal, A or B, is made on such a basis that performance of each of the functions assigned to the azimuth station in the signal format is divided equally between units A and B. The frame request A/B signal is later described more fully with reference to FIGS. 8A and 8B. In response to a frame initiate signal from sequence generator 56, format generator 57 furnishes differential phase shift keying (DPSK) data and control to the transmitter 13, 13' associated with control unit 14, 14' and commands antenna switch 25 to select the antenna 11, 26-28 needed to perform the function If the current function is azimuth guidance, format generator 57 enables beam steering command generator 58 to furnish steering commands to the azimuth scanning beam antenna 11.

Figure 6:
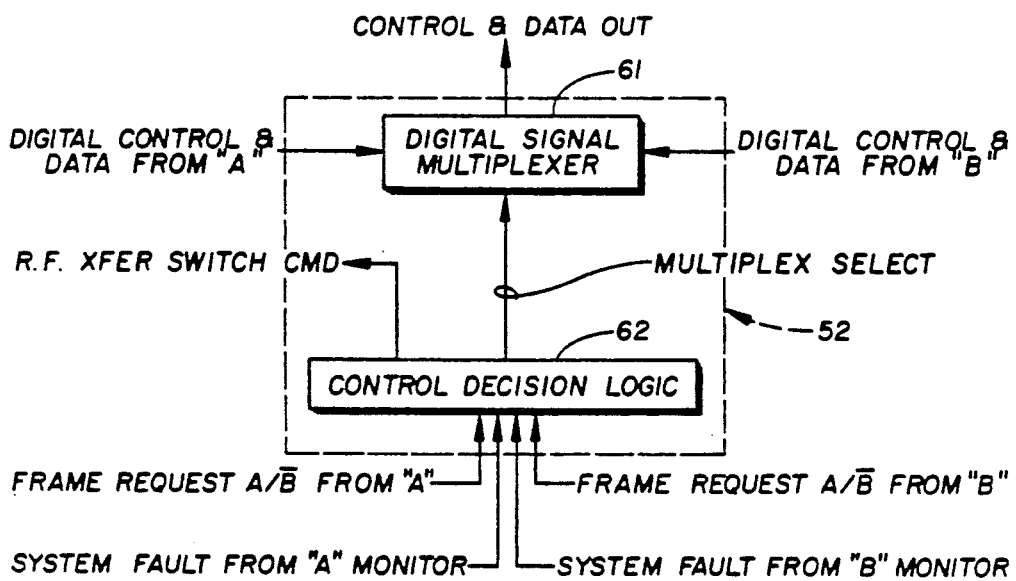
FIG. 6 is a block diagram of the transfer control shown in FIG. 4.

Referring to FIG. 6, transfer control 52 includes a multiplexer 61 and a control decision logic 62. Multiplexer 61 receives digital control and data inputs from electronics unit A and similar control and data inputs from electronics unit B, both of which inputs depend on the function currently to be performed by the azimuth station. Unless a system fault signal is received from either or both of the monitors 15, 15' of units A and B, decision logic 62 honors the frame requests it receives from electronics units A and B to select either the inputs to multiplexer 61 from unit A or from unit B for onward transmission to the input of antenna switch 25 and scanning beam antenna 11 and, simultaneously, selects the appropriate setting for r.f. transfer switch 51. If a fault signal is received, the action of decision logic 62 will be as later described with reference to Table I.

Figure 7A:
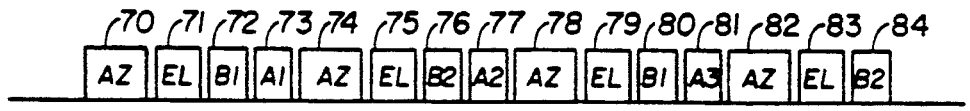
FIG. 7A is a diagram of a simplified TDM signal format used to illustrate operation of the invention.

The operation of the invention will be described as applied to a basic MLS using the TDM signal format shown in FIG. 7A. The signal format of FIG. 7A is an approximation of the signal format of an actual MLS, used here only to demonstrate the invention. One cycle of the signal format of FIG. 7A comprises time frames 70-84. Time frames 71, 75, 79, and 83 are assigned to transmission of elevation guidance signals by the elevation scanning beam antenna 10 (FIG. 1). The remaining time frames of FIG. 7A, assigned to transmissions by the azimuth station (FIG. 4), appear separated from FIG. 7A in FIG. 7B.

Figure 7B:
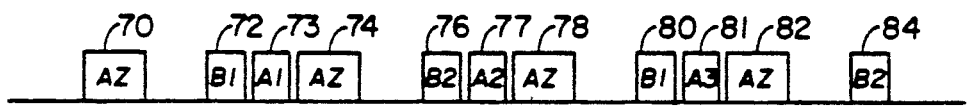
FIG. 7B is a diagram showing those functions of the signal format of FIG. 7A that are transmitted by the azimuth station of FIG. 4.

Referring to FIG. 7B, each cycle of the signal format for the azimuth station includes four time frames 70, 74, 78, 82, assigned to transmission of azimuth guidance signals (AZ); two time frames 72, 80, assigned to transmission of basic data word #1 (B1); two time frames 76, 84, assigned to transmission of basic data word #2 (B2); and time frames 73, 77, and 81, respectively assigned to the transmission of auxiliary data word #1 (A1), auxiliary data word #2 (A2), and auxiliary data word #3 (A3). Basic data words normally contain information relating to the geometry of the MLS installation and auxiliary data words may contain information relating to runway conditions, surface winds, etc.

Referring to FIGS. 5 and 7A, frame format generator 57 contains stored formats for each of the guidance and data word functions of both the azimuth and the elevation stations of the MLS. Considering only the functions to be performed by the azimuth station shown in FIG. 7B, sequence generator 56 first generates a frame request A/B signal that is applied to the control decision logic 62 of transfer control 52. An azimuth station of an MLS according to the invention (FIG. 4) includes redundant electronic units A and B. Sequence generator 56 of electronics unit A and the corresponding sequence generator of electronics unit B (not shown) generate identical outputs, both as to frame request signals and as to frame select and frame initiate signals. After the frame request A/B signal is generated, sequence generator 56 directs format generator 57 to select the proper frame formats for the functions to be performed, as determined by the signal format of FIG. 7B, and directs format generator 57 to initiate output the selected frames at the proper times.

Figure 8A:
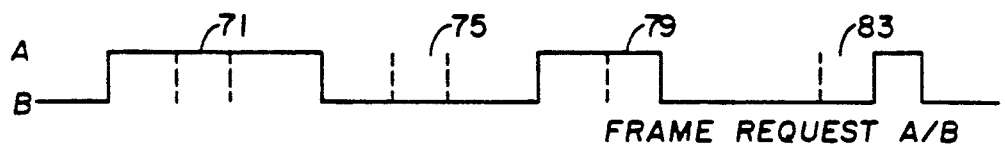
FIGS. 8A and 8B are waveform diagrams of the Frame Request A/B signal used for transferring active operations between the electronic units shown in FIG. 4.

Sequence generator 56 of electronics unit A, and the corresponding sequence generator of electronics unit B, is programmed to generate a frame request signal A/B such that consecutive transmissions of the same guidance or data functions are always controlled by a different one of the units A or B. FIG. 8A shows a suitable frame request A/B signal for transmission of a first cycle of the signal format of FIG. 7B. At the start, frame request A/B is "high", directing control decision logic 62 to select control and data outputs from electronics unit A for utilization and radiation. Frame request A/B continues "high" through time frames 70-73 Just prior to time frame 74 frame request A/B is made "low", directing control decision logic 62 to select control and data outputs from electronics unit B for utilization and radiation. Frame request A/B continues "low" through time frames 74-77 and is made "high" just prior to time frame 78, since the last previous AZ transmission was by unit B. Frame request A/B remains "high" during time frames 78 and 79, then is made "low" for the duration of time frames 80-83, since the last previous transmissions of B1 and AZ were by unit A. Frame request A/B is made "high" for the duration of time frame 84 since the last previous transmission of B2 was by unit B, ending the first cycle of the signal format.

Figure 8B:
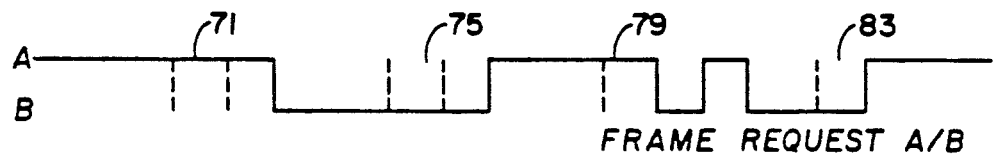

FIG. 8B shows the frame request A/B signal for a second cycle of the signal format. Frame request A/B is initially "high", continuing for the duration of time frames 70-72, since the last previous transmissions of AZ and B1 in the first cycle of the signal format were by unit B. Frame request A/B is made "low" for the duration of time frames 73-76, since the last previous transmissions of A1, AZ, and B2 were by unit A. At the end of time frame 76, frame request A/B is made "high" for the duration of time frames 77-79; "low" for time frame 80; "high" for time frame 81; "low" for time frames 82 and 83; and "high" for time frame 84, ending the second cycle of the signal format.

Since data words A1, A2, and A3 each appear an odd number of times in the signal format of FIG. 7A, the form of the frame request A/B signal must be varied for alternate cycles of the signal format to insure that consecutive transmissions of the same function are made by different ones of the units A and B. Although the elevation station is not shown in FIG. 4, it also includes redundant electronic units similar to the units A and B of the azimuth station. The frame request A/B signal of FIGS. 8A and 8B is formed so that transmissions of the EL guidance function, assigned to time frames 71, 75, 79, and 83 are made by different ones of elevation station electronic units corresponding to units A and B of the azimuth station. Forms of the frame request A/B signal other than those shown in FIGS. 8A and 8B with the signal format of FIG. 7A or a different signal format as long as the frame request A/B signal is so designed that consecutive transmissions are performed by different ones of the redundant electronic units of the MLS.

Control decision logic 62 (FIG. 6) honors the applied frame request A/B signal unless a fault signal is received from either of the monitors 15 or 15' of electronic units A and B. If such a fault signal is received, logic 62 reacts as is shown in Table I, below, either to: suspend operations completely by the MLS; select the non-faulty unit exclusively for further operations by the MLS; or, ignore the fault signal.

TABLE 1

CONTROL DECISION LOGIC

| Unit A Fault Signal | Unit B Fault Signal | Frame Request from Unit A | Frame Request from Unit B | Multiplex Select |
|---|---|---|---|---|
| Fault | Fault | A | A | no change[1] |
| Fault | Fault | B | B | no change[1] |
| Fault | Good | A | A | no change[2] |
| Fault | Good | A | B | select B |
| Good | Fault | A | A | select A |
| Good | Fault | B | B | no change[2] |
| Good | Good | A | A | select A |
| Good | Good | B | B | select B |
| Fault | Fault | A | B | no change[1,3] |
| Fault | Fault | B | A | no change[1,3] |
| Fault | Good | A | B | select B[3] |
| Fault | Good | B | A | select B[3] |
| Good | Fault | A | B | select A[3] |
| Good | Fault | B | A | select A[3] |
| Good | Good | A | B | switch[3,4] |
| Good | Good | B | A | switch[3,4] |

NOTES

[1] Fault signal initiated by field monitor shuts off system operation. Multiplex select is irrelevant.
[2] If one unit is good and one unit is faulty, faulty unit is not selected.
[3] These conditions correspond to a failure in synchronization between the A and B units. Selections shown provide the maximum amount of good data.
[4] Out of synch but both systems good. Continue to switch.

A fault signal initiated by integral monitor antenna 30 most often results from a fault in one of the electronics units so that operation by the MLS can continue safely using the non-faulty electronics unit alone. If the decision logic should fail to respond properly to a fault signal indicating a defective electronics unit and should continue to select the defective unit, no transmissions will occur during the time frames in which the defective unit is selected, since the defective unit is disabled at the time the fault signal is transmitted to the decision logic.

A fault signal that is initiated by field monitor antenna 32 is most often caused by a shift of the guidance antenna foundation or support structure that cannot be remedied by substitution of electronic units. Operation of the MLS is therefore discontinued upon the appearance of such a fault signal.

Obviously, modifications and variations in the invention are possible in the light of the above teachings. It is to be understood that the invention may be practiced otherwise than as specifically disclosed without departing from the spirit and scope of the appended claims.

What is claimed is:

1. In a Microwave Landing System (MLS) transmitting multiple guidance and data functions in an International Standard MLS signal format, the method for switching standby equipment into operation to replace faulty primary equipment, comprising:

providing at least two identical electronic units, each of said electronic units being capable of generating each of said guidance and data functions;

selectively connecting a first one of said electronic units and then a second one of said electronic units to an antenna for radiating as signals transmitted by said MLS the guidance and data functions generated in accordance with said signal format by the one of said first or second electronic units then connected to said antenna, said selective connection of said first and second electronic units to said antenna being such that no two consecutive transmissions of the same one of said guidance or data functions is made by the same one of said first or second electronic units;

monitoring the signals transmitted by said antenna during the times each of said first and second electronic units are connected to said antenna to determine the integrity of said radiated signals;

generating a fault signal associated with the one of said first or second electronic units then connected to said antenna whenever a fault in said signals is detected during said monitoring; and, upon the appearance of said fault signal, discontinuing selection for connection to said antenna of the one of said first and second electronic units that is associated with said fault signal.

2. A method as claimed in claim 1 with the additional steps of:

monitoring from a known location remote from said antenna said guidance signals transmitted by said antenna to determine the accuracy of the guidance information contained in said guidance signals;

generating a second fault signal whenever said monitoring from said remote location reveals that the guidance information contained in said guidance signals is faulty; and discontinuing operation by said MLS upon the appearance of said second fault signal.

3. A method for improving the reliability of operation of a Microwave Landing System (MLS) and the integrity of signals transmitted by said MLS, comprising:

providing a first electronics unit for generating azimuth guidance signals;

providing a first scanning beam antenna for radiating said azimuth guidance signals;

providing a second electronics unit for generating elevation guidance signals;

providing a second scanning beam antenna for radiating said elevation guidance signals;

transmitting said azimuth and elevation guidance signals through said first and second antennas, respectively, in accordance with an International Standard MLS signal format;

providing a third electronics unit identical to said first electronics unit for generating said azimuth guidance signals;

providing a fourth electronics unit identical to said second electronics unit for generating said elevation guidance signals;

selectively connecting either said first electronics unit or said third electronics unit to said first antenna for transmitting as MLS azimuth guidance signals said azimuth guidance signals generated by the one of said first or third electronics units connected to said first antenna;

selectively connecting either said second electronics unit or said fourth electronics unit to said second antenna for transmitting as MLS elevation guidance signals said elevation guidance signals generated by the one of said second or fourth electronics units connected to said second antenna;

said selection of said first or third electronics unit for connection to said first antenna and said selection of said second or fourth electronics unit for connection to said second antenna each being such that no two consecutive transmissions of said MLS azimuth guidance signal is generated by the same one of said first or third electronics unit and that no two consecutive transmissions of said MLS elevation guidance signal is generated by the same one of said second or fourth electronics unit;

monitoring said azimuth guidance signals transmitted by said MLS to detect a fault therein;

generating a first fault signal associated with the one of said first or third electronics units connected to said first antenna at the time a fault is detected in said azimuth guidance signal;

monitoring said elevation guidance signals transmitted by said MLS to detect a fault therein;

generating a second fault signal associated with the one of said second or fourth electronics unit connected to said second antenna at the time a fault is detected in said elevation guidance signal;

upon the appearance of said first fault signal, discontinuing selection for connection to said first antenna of the one of said first or third electronics units associated with said first fault signal; and upon the appearance of said second fault signal, discontinuing selection for connection to said second antenna of the one of said second or fourth electronics units associated with said second fault signal.

4. A method as claimed in claim 3 wherein said steps of monitoring said azimuth guidance signals and monitoring said elevation guidance signals include, respectively, monitoring from a known location said azimuth guidance signals transmitted by said MLS to determine the accuracy of the azimuth guidance information contained therein and monitoring from a known location said elevation guidance signals transmitted by said MLS to determine the accuracy of the elevation guidance information contained therein, with the additional steps of:

generating a third fault signal whenever said monitoring from a known location determines that the guidance information contained in said azimuth guidance signal is faulty;

generating a fourth fault signal whenever said monitoring from a known location determines that the guidance information contained in said elevation guidance signal is faulty; and discontinuing operation by said MLS upon the appearance of either said third or said fourth fault signal.

5. A Microwave Landing System (MLS) of improved reliability, said MLS transmitting azimuth and elevation guidance signals in an International Standard MLS signal format, said signal format having repetitive time frames assigned to said azimuth guidance signals and repetitive time frames assigned to said elevation guidance signals, comprising:

a first group of redundant electronics units, each unit of said first group being capable of generating identical azimuth guidance signals to be transmitted by said MLS;

a second group of redundant electronics units, each unit of said second group being capable of generating identical elevation guidance signals;

a first antenna for transmitting said azimuth guidance signals;

a second antenna for transmitting said elevation guidance signals;

first means for selecting one of said electronics units of said first group for connection to said first antenna for transmitting said azimuth guidance signal during one of said time frames assigned to azimuth guidance;

second means for selecting one of said electronics units of said second group for connection to said second antenna for transmitting said elevation guidance signal during one of said time frames assigned to elevation guidance;

means for controlling said first and second selecting means such that not two consecutive transmissions of azimuth guidance signals is made by the same one of said electronics units of said first group and no two consecutive transmissions of elevation guidance signals is made by the same one of said electronics units of said second group;

first means for connecting the selected one of said electronic units of said first group to said first antenna; and second means for connecting the selected one of said electronic units of said second group to said second antenna.

6. A Microwave Landing System (MLS) as claimed in claim 5, with additionally:

means for detecting the presence of a fault in the azimuth guidance signal transmitted by said MLS and for developing a first fault signal identified with the one of said electronic units of said first group connected to said first antenna at the time of detection a fault in said azimuth guidance signal;

means for detecting the presence of a fault in the elevation guidance signal transmitted by said MLS and for developing a second fault signal identified with the one of said electronic units of said second group connected to said second antenna at the time of detection a fault in said elevation guidance signal;

means for applying said first and said second fault signals to said means for controlling said selecting means, said controlling means being responsive to said fault signal so that the one of said electronics units identified with said first fault signal is not selected for connection to said first antenna after the appearance of said first fault signal and the one of said electronic units identified with said second fault signal is not selected for connection to said second antenna after the appearance of said second fault signal.

7. A Microwave Landing System (MLS) as claimed in claim 6 wherein each of said electronic units of said first group includes a first monitor means and each of said electronic units of said second group includes a second monitor means, with additionally:

a first monitor antenna integrally constructed with said first antenna for providing a first monitor signal;

a second monitor antenna positioned away from said first antenna at a known azimuth location for providing a second monitor signal;

a third monitor antenna integrally constructed with said second antenna for providing a third monitor signal;

a fourth monitor antenna positioned away from said second antenna at a known elevation location for providing a fourth monitor signal;

means for applying said first and second monitor signals to said first monitor means of each of said electronics units of said first group;

means for applying said third and fourth monitor signals to said second monitor means of each of said electronics units of said second group;

said first monitor means of each electronics unit of said first group selected by said first selecting means for connection to said first antenna utilizing said first monitor signal to develop a first fault signal if the azimuth guidance signal transmitted by said MLS fails to conform to said signal format and utilizing said second monitor signal to develop a second fault signal if the azimuth guidance signal transmitted by said MLS fails to conform to the known location of said second monitor antenna;

said second monitor means of each electronics unit of said second group selected by said second selecting means for connection to said second antenna utilizing said third monitor signal to develop a third fault signal if the elevation guidance signal transmitted by said MLS fails to conform to said signal format and utilizing said fourth monitor signal to develop a fourth fault signal if the elevation guidance signal transmitted by said MLS fails to conform to the known location of said fourth monitor antenna; and means for applying said first, second, third, and fourth fault signals to said means controlling said selecting means, said controlling means being responsive to said first and third fault signals to discontinue selecting the electronics unit causing the development of said first fault signal or said third fault signal and being responsive to either of said second fault signal or said fourth fault signal to discontinue operation by said MLS.

8. A Microwave Landing System (MLS) as claimed in claim 5 wherein said first antenna transmits proportional azimuth guidance signals and said second antenna transmits proportional elevation guidance signals, with additionally:

first and second clearance antennas for transmitting azimuth clearance signals;

a third clearance antenna for transmitting elevation clearance signals;

said first connecting means being adapted to connect said selected electronics unit of said first group to one of said first antenna, said first clearance antenna or said second clearance antenna, said second connecting means being adapted to connect said selected electronics unit of said second group to one of said second antenna or said third clearance antenna; and means for controlling said first and second connecting means such that the antennas connected to said selected electronics units of said first and second groups are appropriate for transmitting signals in accordance with said signal format.

9. A Microwave Landing System (MLS) as claimed in claim 6, wherein:

said signal format includes separate time frames assigned to data signals;

each said electronics units of said first group is capable of generating identical data signals in addition to said azimuth guidance signals;

said first antenna is adapted to transmit either said azimuth guidance signals or said data signals as required by said signal format; and said means for detecting a fault in said azimuth guidance signal also detects a fault in said data signal and develops said first fault signal if a fault should be detected in either said azimuth guidance signal or said data signal.

* * * * *